United States Patent [19]

Skarstad et al.

[11] 4,246,327
[45] Jan. 20, 1981

[54] HIGH ENERGY-DENSITY BATTERY SYSTEM

[75] Inventors: Paul M. Skarstad, Wayzata; Thomas G. Hayes, New Brighton, both of Minn.

[73] Assignee: Medtronic, Inc., Minneapolis, Minn.

[21] Appl. No.: 80,528

[22] Filed: Oct. 1, 1979

[51] Int. Cl.³ ............................................. H01M 4/36
[52] U.S. Cl. .................................. 429/105; 429/194; 429/196
[58] Field of Search ............... 429/194, 196, 105, 101

[56] References Cited

U.S. PATENT DOCUMENTS

| 3,427,207 | 2/1969 | Toy et al. | 429/196 |
| 3,990,915 | 11/1976 | Newman et al. | 429/194 |
| 4,177,329 | 12/1979 | Dey et al. | 429/196 X |

Primary Examiner—Charles F. Lefevour
Attorney, Agent, or Firm—Schroeder, Siegfried, Ryan, Vidas, Steffey & Arrett

[57] ABSTRACT

The battery system includes a metallic anode, a cathode/electrolyte comprising a liquid inorganic solvent containing a mixture of an interhalogen having a discharge potential higher than the solvent and a soluble salt of the anode metal, and a high-surface-area cathode current collector means coupled with the cathode/electrolyte.

27 Claims, 2 Drawing Figures

HIGH ENERGY-DENSITY BATTERY SYSTEM

I. DESCRIPTION

BACKGROUND OF PRIOR ART

A variety of high energy-density batteries have become available in recent years. Among these batteries, the lithium/iodine-poly-2-vinylpyridine solid electrolyte batteries have become well known. These batteries, although very reliable, are limited as to the current they are capable of producing due to, among other things, halide ion transport and the formation of a high resistance discharge product i.e., lithium iodide.

Other high energy-density batteries include the thionyl chloride battery and the sulfur dioxide battery. These batteries use a lithium anode and an electrolyte solution of a lithium salt dissolved in thionyl chloride or sulfur dioxide, respectively. Since sulfur dioxide ($SO_2$) is a gas, it must be maintained under pressure to be a liquid at ambient temperatures. These batteries make use of lithium ion transport and deposit the LiCl discharge product over a high-surface-area cathode current collector, such as porous carbon. Consequently, the problems associated with the formation of a high resistance discharge product can be avoided. Despite the unusually high energy density of these batteries, even higher energy densities are desirable.

Oxyhalide batteries have been described in a paper by J. S. Auborn, et al entitled "Lithium Anode Cells Operating at Room Temperature in Inorganic Electrolytic Solutions" in J. Electrochem. Soc. 120, 1613–1619 (1973). This paper also describes batteries in which dissolved bromine is discharged from a phosphorous oxychloride-lithium salt solution and in which dissolved chlorine is discharged from various liquid oxychloride-lithium salt solutions. Related work was reported recently by Liang entitled "A New High Energy Density Battery System" in XII International Conference on Medical and Biological Engineering, Jerusalem, Israel, August 19–24, 1979. This system adds bromine to a thionyl chloride-lithium salt solution. However, the thionyl chloride should discharge preferentially in such a system.

A lithium anode battery using an $ICl_3$ cathode and an organic electrolyte is known. However, despite the use of $ICl_3$, discharge does not proceed to any great extent in this battery.

To minimize the loss of volatile constituents and any reaction thereof with ambient environment, cells of this type are usually sealed as soon as possible after the cell components are brought together.

BRIEF SUMMARY OF THE INVENTION

This invention in its preferred form makes use of the highly energetic lithium anode (other anode metals may be used), highly energetic interhalogens such as the preferred $ICl_3$ or $IF_5$ as a cathode, lithium ion transport and a high-surface-area cathode current collector to provide unique battery systems of higher energy and capacity, high rate systems or tailored low rate systems, and systems of improved volumetric specific capacity. The electrolyte solvent comprises an aprotic inorganic liquid oxide, a liquid halide or a liquid oxyhalide in which lithium salts (or other anode metal salts, if a different anode metal is used) are soluble.

Generally, a system of the invention in its most preferred form will comprise a lithium anode, a cathode/electrolyte comprised of a mixture of $ICl_3$ or $IF_5$, a liquid oxyhalide (the preferred electrolyte solvent) most preferably of phosphorous or sulfur and a soluble lithium salt, and a high surface area cathode current collector means associated with the cathode/electrolyte.

DETAILED DESCRIPTION OF THE INVENTION

Figure 1:
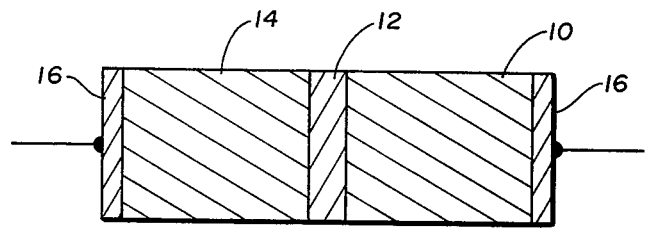
FIGS. 1 and 2 are schematic drawings illustrating the battery systems of the invention.

The battery system of the invention in its most preferred form discharges form discharges an interhalogen cathode component, such as $ICl_3$ or $IF_5$ against a lithium anode. The $ICl_3$ or $IF_5$ is preferably mixed with a liquid oxyhalide such as $SOCl_2$, $SOBr_2$, $SO_2Cl_2$, $POCl_3$ and $SEOCl_2$ (the phosphorous and sulfur oxyhalides being particularly preferred) and a soluble lithium salt eg., $LiICl_4$, $LiSbCl_6$, $Li_2TiCl_6$, $LiAlBr_4$, $LiBCl_4$ or $LiBF_4$ to form a cathode/electrolyte which is coupled or contacted with the lithium anode as shown schematically in FIG. 1. As already indicated, aprotic liquid oxides, such as liquified sulfur dioxide, or aprotic liquid halides, such as arsenic chloride ($AsCl_3$) may be used as the electrolyte solvent with a correspondinly selected soluble anode metal salt.

A high-surface-area cathode current collector of an inert conductive material such as porous carbon 10 is impregnated with the cathode/electrolyte and contacted to one side of a porous separator 12. The anode 14 is brought into contact with the other side of separator 12. Stainless steel or nickel electrodes 16 may be used to contact anode 14 and cathode current collector 10. The liquid oxyhalide or other electrolyte solvent as defined herein, discharges after the interhalogen discharges.

Other interhalogens which have a discharge potential higher than the electrolyte solvent selected may be used, such as $ICl_3$, $IF_5$, $BrF_5$, $BrF_3$, $IF_7$, $ClF_3$ and $ICl$. Anode metals other than lithium may be used. Anode metals to be used in any given instance must be oxidizable by the particular cathode/electrolyte constituents selected and must generate a potential when electrochemically coupled thereto. The metal selected for the anode must also be available in the form of a salt which is soluble in the electrolyte solvent of the cathode/electrolyte. Calcium/$Ca(AlCl_4)_2$ and magnesium/$Mg(AlCl_4)_2$ are examples of such metals and salts which are useful with the oxyhalides and interhalogens set forth hereinabove in various combinations.

Figure 2:
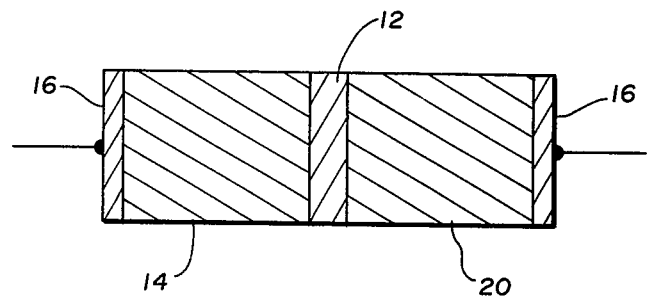

Another preferred form of the battery system is shown in FIG. 2. It uses $SOCl_2$, $LiAlCl_4$ and $ICl_3$ as the cathode/electrolyte which is also saturated with $ICl_3$ and contains a reservoir amount of undissolved $ICl_3$. In this embodiment, the cathode/electrolyte 20 is formed by pressing a blend of about 50–90% $ICl_3$ with about 50–10% of a conductive additive such as carbon black. Thus, in this embodiment, the high-surface-area cathode current collector is incorporated integrally with the cathode/electrolyte. As already stated, a satisfactory pressed pellet may be obtained, for example, by mixing 90% $ICl_3$ and 10% carbon and pressing the mixture lightly to about 75% density to form a pellet. A solution of $SOCl_2$ containing 0.1 mole of $LiAlCl_4$ per mole of $SOCl_2$ and saturated with $ICl_3$ is then added to the pellet to form body 20. Preferably, an amount of solution adequate to fill the pores of body 20 is adequate. However, varying amounts of such a solution may be added depending on the current level desired.

The preferred anodes may be formed by pressing lithium foil onto nickel or stainless steel screen although various other styles may be used.

To assemble the battery of FIG. 2, te anode 14 and cathode/electrolyte pellet 20 are contacted to opposite sides of a porous separator 12 and are electrically contacted with lead wires and electrodes. The porous separator may typically be fiberglass cloth or paper or porous polypropylene and the like as are already known in the art. Assembly should take place in a dry room or dry box at a relative humidity of less than 1%.

In another embodiment of the invention, the cathode/electrolyte may be formed as a dense slurry of carbon or the like, $ICl_3$ or other interhalogen, a soluble anode metal salt and the liquid electrolyte component.

All of the above-described battery systems of the invention operate similarly to the thionyl chloride systems in that the liquid phase transports the anode metal ion, such as the lithium ion, to the cathode current collector. However, the cathode component which is preferentially discharged i.e., reduced, is the interhalogen, the activity of which may be maintained by the presence of excess reservoir amounts, as in the case of a solid such as $ICl_3$.

EXAMPLES

The following cells were constructed with a cross-sectional area of $0.63$ cm$^2$. The anode comprised lithium packed in a stainless steel cup. A fluorocarbon plastic cylinder having a cross-sectional area of $0.63$ cm$^2$ was pressed into the lithium. A separator of fiberglass paper was laid over the anode inside the cylinder. An amount of cathode/electrolyte in liquid form was poured into the cylinder. A stainless steel rod tipped with a PTFE-bonded porous carbon tip 1 mm long and $0.63$ cm$^2$ in cross-section was inserted into the cylinder and the liquid cathode electrolyte and pressed against the separator. This arrangement provides a high-surface-area carbon body. Cabot Vulcan XC-72 carbon is satisfactory for this purpose. The data listed below were taken immediately after assembly of the cell.

I. 0.438 g. $Li_2O.2AlCl_3$/1.73 g. $SOCl_2 + ICl_3 \rightarrow$ Liquid (Saturated with $ICl_3$)

Voltage Reading (Millivolts) for 2 Batteries Under Load

| Load | Open Circuit | 100KΩ | 50KΩ | 10KΩ | 1KΩ |
| --- | --- | --- | --- | --- | --- |
| 1. | 4087 | 4070 | 4057 | 3890 | 3524 |
| 2. | 4104 | 4079 | 4062 | 3998 | 3495 |

II. 0.65 g. $LiAlCl_4$/4.80 g. $SOCl_2 + ICl_3 \rightarrow$ Liquid (Saturated With $ICl_3$)

Voltage Reading (Millivolts) for 2 Batteries Under Load

| Load | Open Circuit | 100KΩ | 50KΩ | 10KΩ | 1KΩ |
| --- | --- | --- | --- | --- | --- |
| 1. | 3914 | 3910 | 3906 | 3873 | 3405 |
| 2. | 3910 | 3906 | 3901 | 3854 | 3276 |

III. 0.48 g. $LiICl_4$/2.72 g. $SOCl_2 + ICl_3 \rightarrow$ Liquid (Saturated With $ICl_3$)

Voltage Reading (Millivolts) for 2 Batteries Under Load

| Load | Open Circuit | 100KΩ | 50KΩ | 10K | 1KΩ |
| --- | --- | --- | --- | --- | --- |
| 1. | 3890 | 3881 | 3775 | 3836 | 3398 |
| 2. | 3906 | 3903 | 3898 | 3872 | 3500 |

IV. 0.65 g. $LiAlCl_4$/4.4 g. $POCl_3 + ICl_3 \rightarrow$ Liquid (Saturated With $ICl_3$)

Voltage Reading (Millivolts) For 2 Batteries Under Load

| Load | Open Circuit | 100KΩ | 50KΩ | 10KΩ | 1KΩ |
| --- | --- | --- | --- | --- | --- |
| 1. | 3815 | 3810 | 3805 | 3790 | 3412 |
| 2. | 3829 | 3825 | 3820 | 2807 | 3441 |

As the above load data demonstrates, the voltage of these batteries is higher than that produced by prior art thionyl chloride batteries and the like.

Having described the invention, the exclusive property rights to which applicants are entitled are defined in the following claims:

We claim:

1. A battery system having a metallic anode and a cathode/electrolyte, means electrochemically coupling the anode and cathode/electrolyte and wherein the cathode/electrolyte comprises an electrolyte solvent selected from the group consisting of aprotic inorganic liquid oxides, liquid halides and liquid oxyhalides which are solvents for at and containing least one salt of the anode metal, an interhalogen having a discharge potential higher than that of the electrolyte solvent selected and a soluble salt of the anode metal.

2. The battery system of claim 1 wherein the coupling means comprises porous separator means.

3. The battery system of claim 1 wherein the anode comprises lithium.

4. The battery system of claim 1 wherein the electrolyte solvent is a phosphorous oxyhalide.

5. The battery system of claim 1 wherein the electrolyte solvent is a sulfur oxyhalide.

6. The battery system of claim 1 wherein the interhalogen is $ICl_3$.

7. The battery system of claim 6 wherein the anode is lithium.

8. The battery system of claim 1 wherein the interhalogen is $IF_5$.

9. The battery system of claim 1 including a high-surface-area cathode current collector.

10. The battery system of claim 9 wherein the collector is a body comprised of porous carbon.

11. The battery system of claim 10 wherein the cathode/electrolyte impregnates the porous carbon collector.

12. The battery system of claim 9 wherein the collector comprises a plurality of carbon particles dispersed throughout the cathode/electrolyte.

13. The battery system of claim 12 wherein the cathode/electrolyte and cathode current collector jointly comprise a body consisting essentially of a mixture of about 50-90% $ICl_3$, balance carbon particles, and also containing an added amount of a solution of $SOCl_2$ and a soluble lithium salt, the solution being saturated with $ICl_3$.

14. The battery system of claim 1 wherein the electrolyte solvent is $SOCl_2$.

15. The battery system of claim 1 wherein the cathode/electrolyte and cathode current collector jointly comprise a mixture of the interhalogen and inert conductive particles and also containing an added amount of a solution of the electrolyte solvent and the soluble salt of the anode metal.

16. The battery system of claim 1 wherein the cathode/electrolyte comprises a liquid slurry.

17. The battery system of claim 1 wherein the electrolyte solvent is liquid sulfur dioxide.

18. A battery system comprising a lithium anode, a cathode/electrolyte comprising a solution of a soluble lithium salt and a mixture comprising a liquid oxyhalide and $ICl_3$, cathode current collector means contacting the cathode/electrolyte, and means electrochemically coupling the anode and cathode/electrolyte.

19. The battery system of claim 18 in which $IF_5$ replaces the $ICl_3$.

20. The battery system of claim 18 in which the $ICl_3$ saturates the cathode/electrolyte.

21. The battery system of claim 20 in which the cathode/electrolyte includes an excess reservoir amount of undissolved $ICl_3$.

22. The battery system of claim 18 in which the cathode current collector means comprises a high-surface-area material.

23. The battery system of claim 18 in which the cathode current collector means comprises a porous carbon body.

24. The battery system of claim 18 in which the cathode current collector means is integrally incorporated into the cathode/electrolyte.

25. The battery system of claim 24 in which the cathode/electrolyte is a thickened paste-like material.

26. The battery system of claim 25 in which the cathode/electrolyte is a pressed body.

27. The battery system of claim 18 in which the coupling means comprises porous separator means.

* * * * *

UNITED STATES PATENT AND TRADEMARK OFFICE
CERTIFICATE OF CORRECTION

PATENT NO. : 4,246,327
DATED : January 20, 1981
INVENTOR(S) : Paul M. Skarstad and Thomas G. Hayes It is certified that error appears in the above-identified patent and that said Letters Patent are hereby corrected as shown below:

Column 2, line 13, delete "form discharges" second occurrence.

Column 2, line 17, "SEOCl$_2$" should be --SeOCl$_2$--.

Column 2, line 57, illegibly printed chemical symbol should be --ICl$_3$--.

Column 3, line 6, "te" should be --the--.

Column 3, line 46, "Li$_2$O.2AlCl$_3$" should be -- Li$_2$O·2AlCl$_3$ --.

Column 4, line 36, "at and containing" should be --and containing at--.

Signed and Sealed this

Fourth Day of August 1981

[SEAL]

Attest:

Attesting Officer

GERALD J. MOSSINGHOFF

Commissioner of Patents and Trademarks